United States Patent [19]
Siyahi

[11] 3,861,214
[45] Jan. 21, 1975

[54] TEMPERATURE MEASURING INSTRUMENT

[75] Inventor: Mustafa Siyahi, Yellow Springs, Ohio

[73] Assignee: The Yellow Springs Instrument Company, Inc., Yellow Springs, Ohio

[22] Filed: Nov. 19, 1973

[21] Appl. No.: 417,220

[52] U.S. Cl. .............................. 73/362 AR
[51] Int. Cl. ............................... G01k 7/24
[58] Field of Search ..... 73/362 AR, 362 R, 362 CP, 73/362 SC; 324/62 R; 330/103, 104

[56] References Cited
UNITED STATES PATENTS

| | | | |
|---|---|---|---|
| 3,089,097 | 5/1963 | Bell | 330/103 X |
| 3,754,442 | 8/1973 | Arnett | 73/362 AR |
| 3,783,692 | 1/1974 | Hansen | 73/362 AR |

*Primary Examiner*—Jerry W. Myracle
*Attorney, Agent, or Firm*—Biebel, French & Bugg

[57] ABSTRACT

A temperature sensing device achieves exceptional linearity over a range of several hundred degrees centigrade by taking as a measuring signal the output from a differential amplifier which has a platinum resistance temperature sensor in a feedback path to its negative input terminal and a resistor in a feedback path to its positive input terminal. A potential divider arrangement is provided for application of a reference voltage across the input terminals of the differential amplifier, and this reference voltage may be adjusted for an output null at any desired reference temperature. In operation the resister in the positive feedback path causes an increasing current flow through the platinum resistance temperature sensor as the output voltage from the differential amplifier increases. This increasing current compensates for the naturally occurring decrease with incresing temperature of the slope of the sensor's temperature-resistance performance characteristic.

13 Claims, 4 Drawing Figures

TEMPERATURE MEASURING INSTRUMENT

BACKGROUND OF THE INVENTION

This invention relates to temperature sensing devices and compensating networks therefor. More particularly the invention relates to high precision temperature measuring devices employing a platinum resistance temperature sensor. Such temperature sensors as commonly used in precision thermometry employ a platinum wire which exhibits a predictable change in electrical resistance as a function of temperature. These sensors have a positive temperature coefficient and provide a very linear response over a limited temperature range. However, when linear operation is required over a range of several hundred degrees or more, some form of compensating or linearizing network must be employed.

Prior art temperature measuring instruments commonly employ a Wheatstone bridge arrangement to convert temperature dependent resistance changes to an output voltage. In such an arrangement the platinum resistance thermometer is used as an active arm for the bridge. The difficulty with this has been that the bridge itself introduces a non-linear characteristic into the output voltage curve, and this is in addition to the inherent non-linearity of the platinum resistance sensor. In some cases the output of the bridge arrangement may be satisfactorily linearized by use of a passive network. In other cases wherein linearity over a relatively wide temperature range is desired there may be employed a bridge provided with an active linearizing network. Such an arrangement is disclosed for instance in Rose U.S. Pat. No. 3,406,331. This patent shows a resistance bridge having two branches, one of which comprises an active arm and an adjacent arm, and regulating means to linearize the output by controlling the operation of the active arm. While such bridge arrangements with an active compensating network provide reasonably good linearity over a fairly wide temperature range, they are rather complex and expensive to fabricate. Other prior art arrangements may employ an operational amplifier for linearizing the output of a platinum resistance temperature sensor as shown at FIG. 1 of the appended drawing. An arrangement of this type is easily and inexpensively fabricated from commercially available solid state components, but the output thereof is not sufficiently linear for wide range, high accuracy work.

SUMMARY OF THE INVENTION

In accordance with this invention there is provided an improved temperature measuring instrument wherein a thermally variable resistive element is employed in combination with a differential input operational amplifier in a novel feedback arrangement. In this arrangement the differential amplifier is connected to have feedback from its output terminal to both of its non-inverting and its inverting input terminals. The thermally variable resistive element, preferably a platinum resistance temperature sensor, is inserted into the feedback path to the inverting or negative input terminal. The feedback path to the non-inverting or positive input terminal may comprise merely a resistor of appropriately selected resistance. In operation the resistance of the thermally variable resistive element increases with temperature but by an amount which continually decreases with increasing temperature. The feedback path to the positive input terminal of the differential amplifier compensates for this non-linearity by causing an increasing current flow through the temperature sensor with increasing output voltage from the differential amplifier. When used in combination with an appropriate input power supply, the above arrangement can measure temperatures between the range from about 0°centigrade to about 600°centigrade with a linearity error of less than about 0.3°centigrade over the entire range.

Accordingly it is an object of this invention to provide a simple temperature measuring instrument having high accuracy over a wide temperature range.

Other objects and advantages of the invention will be apparent from the following description, the accompanying drawings and the appended claims.

DESCRIPTION OF THE PREFERRED EMBODIMENT

Figure 1:
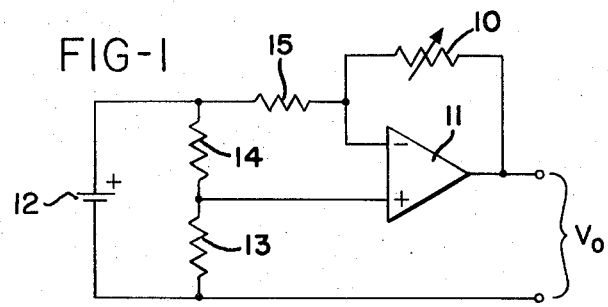
FIG. 1 illustrates a prior art temperature measuring instrument.

For better understanding of the present invention there is shown in FIG. 1 a typical prior art device wherein a resistive element 10 is placed in a feedback path around an operational amplifier 11 to produce a somewhat linear output voltage $V_0$. Also included in the prior art circuit are a potential source 12 and three resistors 13, 14 and 15. For such a prior art system wherein active element 10 may be a platinum resistance temperature sensor, there may be produced an output voltage having a non-linearity error of about 8.5% over a voltage range corresponding to a temperature range from about -50°C to about 600°C. Typically the platinum resistance temperature sensor in such a device may have a resistance of about 100 ohms at 0°C and the circuit may be adjusted for a voltage null at 0°C and an output slope at that point of about 1 millivolt per degree centigrade. At a temperature of about 600°C the output may be about 545 millivolts which represents an error of 55°C.

Figure 2:
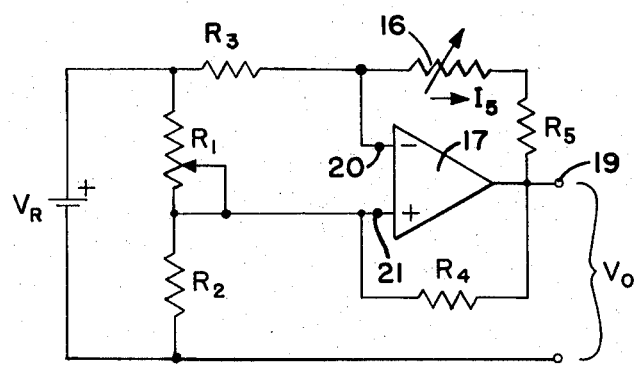
FIG. 2 illustrates a temperature measuring instrument constructed in accordance with this invention.

As shown in FIG. 2 the apparatus of this invention places a thermally variable resistive element 16 in a feedback path around an operational amplifier 17 (which typically may have a gain of around 300,000) and a resistor $R_4$ in a second feedback path around the operational amplifier. Sensor 16 is placed in a path between the output and negative input terminals 19 and 20 of operational amplifier 17, while resistor $R_4$ is placed in a path between output terminal 19 and the positive input terminal 21. As further illustrated by FIG. 2, a circuit in accordance with this invention employs an input potential source $V_R$ which has its output terminals connected to a pair of resistors $R_1$ and $R_2$. Resistors $R_1$ and $R_2$, which are discussed in more detail, below are commonly connected to positive input terminal 21 of operational amplifier 17. The feedback path from terminal 19 to terminal 20 includes a resistor $R_5$ as well as thermal element 16, and there is a resistor $R_3$ connected between negative input terminal 20 of operational amplifier 17 and the positive output terminal of source $V_R$. The connection through $R_3$ provides the current flow $I_5$ through thermal element 16. Preferably $R_3$ should have a resistance between about 0.1 and 10 times the resistance of $R_1$.

Figure 3:
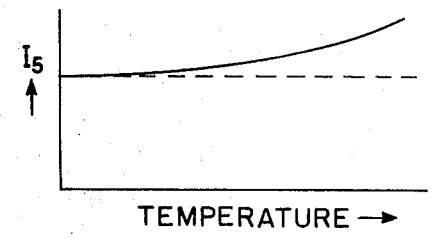
FIG. 3 is a plot illustrating current flow through a platinum resistance temperature sensor incorporated within the arrangement of FIG. 2.

The most significant difference between the circuit of FIG. 2 and the prior art circuit of FIG. 1 is the addition of resistor $R_4$ between terminals 19 and 20. A principal function of resistor $R_4$ is to cause an increase in sensor current $I_5$ as the measured temperature increases, and this increasing current compensates for the inherent resistive non linearity of sensor 16. The variation of current $I_5$ with the change in temperature is illustrated generally by FIG. 3. Concomitant with the increase in $I_5$, the resistance of sensor 16 increases at a decreasing rate, so that the voltage across sensor 16, which is the resistance-current product, increases with temperature in a very nearly linear manner.

Analysis of the circuit of FIG. 2 indicates that for $V_0$ adjusted to zero at some reference temperature the following relationship holds to a very good approximation:

$$V_o = -(R_2 + R_4/R_4) I_{so}(\Delta R / 1 - G \Delta R)$$

where $$G \equiv R_2 / R_4(R_3 + R_{so} + R_5)$$

and $$I_{so} \approx _{R4} V_R G/R_2$$

In these equations $R_{so}$ is the resistance of sensor 16 at the reference temperature, and $\Delta R$ is the difference between the resistance of sensor 16 at the temperature corresponding to the output voltage $V_o$ and resistance $R_{so}$, and $I_{so}$ is the magnitude of sensor current $I_5$ at the reference temperature.

In general $\Delta R$ is a quadratic function of the temperature change $\Delta T$ above 0°C, but for commonly available sensors the resistance expression $$\Delta R / 1 - G \Delta R$$

varies about linearly with temperature, so that $$V_o \approx K \Delta T$$

where K is the slope factor upon which the design is based. For resistance values as mentioned below, K may have a value very nearly equal to 1 millivolt per degree centigrade.

For analysis of the circuit linearity it is convenient to employ a deviation parameter $\epsilon$ defined by the expression $$\epsilon = (R_2 + R_4/R_4) I_{so} (\Delta R / 1 - G \Delta R) - K \Delta T$$

Figure 4:
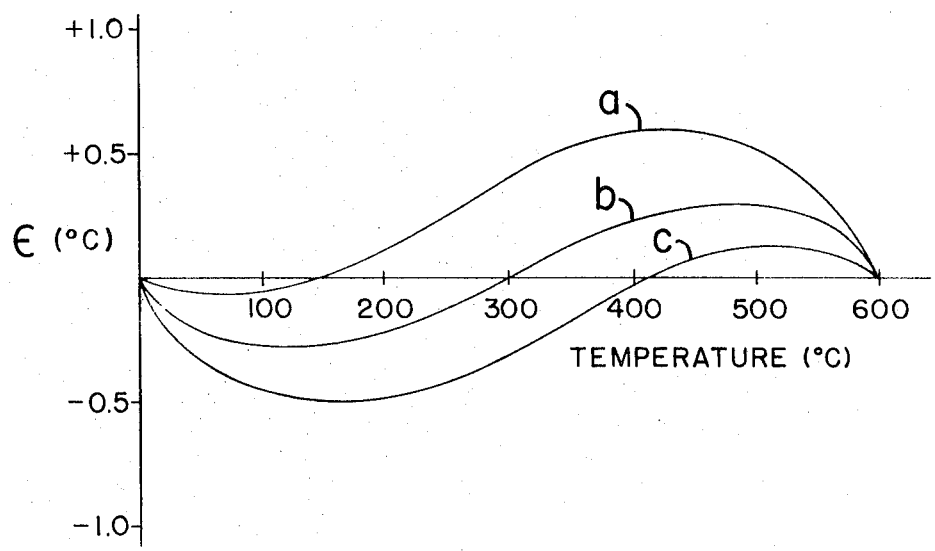
FIG. 4 is a plot illustrating the linearity deviation of the temperature measuring instrument of FIG. 2.

FIG. 4 shows the variation of $\epsilon$ with temperature as observed for three simulated circuits wherein sensor 16 of FIG. 2 has been replaced by a simple variable resistor. For generation of this data the variable resistor was adjusted over a range from 100 to 316.38 ohms to represent the performance of a platinum resistance sensor such as a YSI-Sostman and Co. PT-139. The performance of such a sensor is as follows:

| Temp. °C | Resistance |
|---|---|
| 0 | 100 ohms |
| 300 | 213.75 ohms |
| 600 | 316.38 ohms |

Further for such a sensor the slope of the temperature resistance curve at 0°C is about 0.398 ohms per deg C and the error term is about $-6.18 \times 10^{-5}$ ohms per $\deg^2$.

Curve $a$ of FIG. 4 represents the error for a circuit wherein resistances $R_2$, $R_3$, $R_4$, and $R_5$ are selected to produce a factor G of $4.4 \times 10^{-4}$ mhos. For curves $b$ and $c$ the G values were $4.51 \times 10^{-4}$ mhos and $4.6 \times 10^{-4}$ mhos respectively. In each case the potential source $V_R$ was about 2.63 volts and the operational amplifier was a National Semiconductor amplifier model LM-312 with an appropriate trimming resistor (not shown). The test data shown in FIG. 4 has been verified at selected temperatures by tests of actual temperature sensing systems.

Inspection of FIG. 4 indicates that the non-linearity error may be minimized over a desired temperature range by designing the circuit to produce a curve such as curve $b$. The value of G which produces curve $b$ may be referred to as $G_{opt}$ and in general this optimum value of G is given by the equation:

$$G_{opt} = 2(R_{300} - R_{so}) - (R_{600} - R_{so})/(R_{300} - R_{so})(R_{600} - R_{so})$$

where $R_{so}$ again denotes the resistance of sensor 16 at the reference temperature (0°C) and $R_{300}$ and $R_{600}$ denote the sensor resistance at temperatures of 300° and 600°C.

As mentioned above, curve $b$, which corresponds to an optimum design configuration, is produced when G has a value of $4.51 \times 10^{-4}$ mhos. Referring now to the above set out defining equation for G, it will be seen that G can be set as desired by proper selection of the resistors $R_2$, $R_3$, $R_4$, and $R_5$. One set of resistances which may for example produce $G = 4.51 \times 10^{-4}$ mhos are 1,903 ohms, 1,000 ohms, 2,107 ohms, and 900 ohms for resistors $R_2$, $R_3$, $R_4$, and $R_5$ respectively. As illustrated by FIG. 4 such a selection of resistors will produce a maximum deviation of only about ±0.3°C over the range from 0° to 600°C, and no deviation at the end points of the range. The magnitude of $I_{so}$ for such a configuration is about 1.32 milliamperes.

The resistance value for $R_1$ is determined by the requirement that $V_o$ be zero at the reference temperature of zero deg C. Further analysis of the circuit of FIG. 2 indicates that for $V_o$ equal zero, the following condition exists:

$$R_2 R_3 R_4 / R_2 + R_4 = R_1(R_{so} + R_5)$$

so that $$R_1 = R_2 R_3 R_4 / (R_{so} + R_5)(R_2 + R_4)$$

This equation may be solved by substituting the above stated resistance values therein to produce the result that $R_1$ should be about 1,000 ohms to produce an output null at 0°C. for the embodiment of the invention herein described with reference to FIGS. 2 and 4. In practice, however, some minor adjustment must be made to achieve the desired null, so $R_1$ should be a variable resistor as illustrated.

While the form of apparatus herein described constitutes a preferred embodiment of the invention, it is to be understood that the invention is not limited to this precise form of apparatus, and that changes may be made therein without departing from the scope of the invention.

What is claimed is:
1. A temperature measuring instrument comprising:
   a. a potential source having first and second ouput terminals,
   b. first resistance means connected at one side thereof to the first output terminal of said potential source,
   c. second resistance means connected at one side thereof to the second output terminal of said potential source and connected at the other side thereof to the side of said first resistance means which is remote from the first output terminal of said potential source,
   d. a differential amplifier having an output terminal and first and second input terminals; said second input terminal being connected to the point between said first and second resistance means,
   e. means including third resistance means connecting the first input terminal of said differential amplifier to the first output terminal of said potential source,
   f. a thermally variable resistive element connected between the output and first input terminals of said differential amplifier, and
   g. fourth resistance means connected between the output and second input terminals of said differential amplifier.

2. Apparatus according to claim 1 said first and second input terminals of said differential amplifier being respectively negative and positive input terminals.

3. Apparatus according to claim 2 said first output terminal of said potential source being a positive output terminal.

4. Apparatus according to claim 1 said third resistance means having a resistance ranging between about 0.1 and 10 times the resistance at said first resistance means.

5. Apparatus according to claim 4 further comprising fifth resistance means in series with said thermally variable resistive elements.

6. Apparatus according to claim 5 said thermally variable resistive element comprising a platinum resistance temperature sensor, having a resistance of about 100 ohms.

7. Apparatus according to claim 6 said first resistance means comprising means for varying the resistance thereof for nulling the output of said differential amplifier at a predetermined temperature.

8. Apparatus according to claim 7 characterized by a value in the order of about $4.51 \times 10^{-4}$ mhos for the parameter G wherein G is defined by the equation $$G = R_2/R_4(R_3+R_{so}+R_5)$$

and $R_{so}$ is the resistance of the thermally variable resistive element at a temperature of zero degrees centigrade and $R_2$, $R_3$, $R_4$, and $R_5$ are respectively the aforesaid second, third, fourth, and fifth resistance means.

9. Apparatus according to claim 7 said first and second input terminals of said differential amplifier being respectively negative and positive input terminals and said first output terminal of said potential source being a positive output terminal.

10. Apparatus according to claim 5 said thermally variable resistive element comprising a platinum resistance temperature sensor.

11. A temperature measuring instrument comprising a differential amplifier, provided with an output terminal and a pair of input terminals, a thermally variable resistive element arranged in a feedback path from said output terminal to one of said input terminals, and a resistive element arranged in a feedback path from said output terminal to the other of said input terminals.

12. Apparatus according to claim 11 further comprising means for application of a reference potential across said first and second input terminals.

13. Apparatus according to claim 12 said thermally variable resistive element comprising a platinum resistance temperature sensor.

* * * * *